(12) United States Patent
Stafford (10) Patent No.: US 12,487,473 B2
(45) Date of Patent: Dec. 2, 2025

(54) MIXED REALITY OPTICAL SYSTEM USING MICRO PHOSPHOR AND LENS ELEMENT ARRAY IN A CURVED WAVEGUIDE

(71) Applicant: Sony Interactive Entertainment Inc., Tokyo (JP)

(72) Inventor: Jeffrey R. Stafford, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 872 days.

(21) Appl. No.: 17/571,410

(22) Filed: Jan. 7, 2022

(65) Prior Publication Data
US 2023/0221582 A1    Jul. 13, 2023

(51) Int. Cl.
*G02B 27/01* (2006.01)
*G02C 7/10* (2006.01)

(52) U.S. Cl.
CPC ........... *G02C 7/10* (2013.01); *G02B 27/0172* (2013.01); *G02B 2027/0178* (2013.01)

(58) Field of Classification Search
CPC ...... G03B 21/00–64; H04N 9/31–3197; G02B 27/00–648; G02B 2027/0105–0198
See application file for complete search history.

(56) References Cited

U.S. PATENT DOCUMENTS

| | | | |
|---|---|---|---|
| 6,191,759 B1* | 2/2001 | Kintz | G02B 27/022 359/631 |
| 10,681,316 B1 | 6/2020 | Tiana et al. | |
| 11,202,043 B1 | 12/2021 | Elazhary et al. | |
| 2001/0005262 A1* | 6/2001 | Tsurushima | G03B 21/14 353/121 |
| 2009/0080215 A1* | 3/2009 | Anandan | G02B 6/0036 250/461.1 |
| 2010/0007855 A1* | 1/2010 | Murata | G03B 21/005 353/31 |
| 2010/0253489 A1 | 10/2010 | Cui et al. | |
| 2018/0190011 A1* | 7/2018 | Platt | G02B 27/017 |
| 2018/0371315 A1 | 12/2018 | Hofmann et al. | |
| 2019/0204602 A1* | 7/2019 | Wu | G02B 6/0055 |
| 2020/0393678 A1* | 12/2020 | Leuenberger | G02B 27/0172 |

(Continued)

FOREIGN PATENT DOCUMENTS

| | | | |
|---|---|---|---|
| JP | 2001249399 A | 9/2001 | |
| JP | 2003330104 A | 11/2003 | |
| JP | 2017531817 A | 10/2017 | |

(Continued)

OTHER PUBLICATIONS

"International Search Report and Written Opinion", dated Apr. 26, 2023, issued in the counterpart PCT application PCT/US22/82386.

(Continued)

*Primary Examiner* — Christopher A Lamb, II
(74) *Attorney, Agent, or Firm* — Kilpatrick Townsend & Stockton LLP (57) ABSTRACT

A sunglasses-style head worn display includes a curved waveguide with double reflective coatings/films and containing an array of light wavelength converting phosphor pinhole-size discs covered with pinhole-sized micro lenses, presenting a wide FOV virtual image for AR/VR.

20 Claims, 5 Drawing Sheets

(56) References Cited

U.S. PATENT DOCUMENTS

2021/0408761 A1\* 12/2021 Scheller ............... H01S 5/1833

FOREIGN PATENT DOCUMENTS

| JP | 2018528446 | A | 9/2018 |
| JP | 2018189963 | A | 11/2018 |
| JP | 2020526793 | A | 8/2020 |
| WO | 2021157247 | A1 | 8/2021 |

OTHER PUBLICATIONS

Japanese Application No. JP2024-537164, Office Action, Mailed On May 27, 2025, 7 pages.

\* cited by examiner

MIXED REALITY OPTICAL SYSTEM USING MICRO PHOSPHOR AND LENS ELEMENT ARRAY IN A CURVED WAVEGUIDE

FIELD

The present application relates generally to wide field of view (FOV) optics for Mixed Reality, encompassing Augmented Reality (AR) and/or Virtual Reality (VR), utilizing an array of pinhole sized micro lenses juxtaposed with light wavelength converting phosphor micro displays within a double reflective curved waveguide.

BACKGROUND

As recognized herein, there is a desire for future wide FOV VR and AR systems to look like a pair of sunglasses, being very thin, lightweight, and curved to provide close form fitting and a wide FOV (especially for VR).

SUMMARY

As further recognized herein, current technologies to achieve both AR/VR in very thin and lightweight form factors use flat waveguide technologies. This is because the waveguides (made of glass or plastic) require the effect of Total Internal Reflection (TIR) to bounce display image light within the waveguide to expand the image from a tiny display area up to a large area that is directed towards a user's eye, via a process called Exit-Pupil Expansion. TIR can only work within a flat or close to flat waveguide, because in a curved waveguide the light would escape the TIR requirements (bouncing light around 42 degrees and below incident to the plane of the waveguide) and exit the waveguide incorrectly. Therefore, it is extremely difficult to create curved waveguide-based optics for VR/AR that have enough efficiency to be effective, due to the light loss.

To meet the above challenges, a system contains a UV display and a curved waveguide with a double-sided UV reflective coating/film and containing an array of light wavelength converting phosphor pinhole-size discs, which are covered with pinhole-sized micro lenses.

Accordingly, in an aspect an assembly includes a curved waveguide, a first ultraviolet (UV) light-reflecting coating or film disposed on the waveguide, and a second UV light-reflecting coating or film disposed on the waveguide. At least one UV emitter is configured to emit UV light into the waveguide between the first and second UV light-reflecting coatings and/or films. At least one light wavelength conversion element such as such as a phosphor disc is in the waveguide and is disposed to receive UV light from the UV emitter reflected by the UV light-reflecting coatings and/or films. The conversion element is configured to convert UV light into visible light that propagates through one or both UV light-reflecting coatings and/or films and that impinges on the eye of a wearer of the waveguide.

In an example the assembly is configured as sunglasses and the waveguide is coupled to left and right temples to be disposed in front of a wearer's face when the assembly is worn by the wearer.

At least one lens may be juxtaposed with the conversion element through which visible light emitted by the conversion element passes. Plural conversion elements may be disposed in the waveguide.

In example implementations the UV light-reflecting coatings and/or films pass visible light.

The conversion element can be juxtaposed with an outer surface of the waveguide, placed at gaps within the UV reflecting coatings and/or films. Or, the conversion element can be juxtaposed with an inner surface of the waveguide, where there are no gaps within the UV reflecting coatings and/or films. The conversion element in general may be positioned anywhere in the path of UV light within the waveguide.

In some examples, a UV light passageway is defined between the UV light-reflecting coatings and/or films, and at least one UV sensor can be provided outside the UV light passageway to generate at least one signal upon detection of UV light. The signal is operable to cause the UV emitter to stop emitting UV light into the light passageway.

The UV emitter may include at least one UV display, emitting one or more UV wavelength bands of light.

In another aspect, an apparatus includes at least one curved waveguide configured to be worn on the head of a person and defining an ultraviolet (UV) light passageway in which UV light is constrained from passing through. At least one UV emitter is optically coupled to the light passageway to emit demanded virtual reality (VR) or augmented reality (AR) images into the light passageway. Also, at least one conversion element is disposed in the light passageway to receive UV light from the UV emitter. The conversion element is configured to convert UV light into visible light that propagates out of the light passageway to impinge on an eye of the person when the person is wearing the waveguide.

In another aspect, an apparatus includes at least one curved waveguide configured to be worn on the head of a person and defining an ultraviolet (UV) light passageway in which UV light is constrained from passing through. At least one UV emitter is optically coupled to the light passageway to emit demanded virtual reality (VR) or augmented reality (AR) images into the light passageway. At least one UV sensor is outside the UV light passageway to generate at least one signal upon detection of UV light. The signal is operable to cause the UV emitter to stop emitting UV light into the light passageway.

In another aspect, an apparatus includes at least one curved waveguide configured to be worn on the head of a person and defining an infra-red (IR) light passageway, in which IR light is constrained from passing through, by the way of IR reflecting coatings and/or films on at least one side of the waveguide. At least one IR emitter is provided, and at least one IR sensor can be provided outside the IR light passageway to generate at least one signal upon detection of IR light. The signal is operable to cause the IR emitter to stop emitting IR light into the light passageway. At least one IR emitter is optically coupled to the light passageway to emit demanded virtual reality (VR) or augmented reality (AR) images into the light passageway. Also, at least one conversion element is disposed in the light passageway to receive IR light from the IR emitter. The conversion element is configured to convert IR light into visible light that propagates out of the light passageway through a micro focusing lens to impinge on an eye of the person when the person is wearing the waveguide. The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 1:
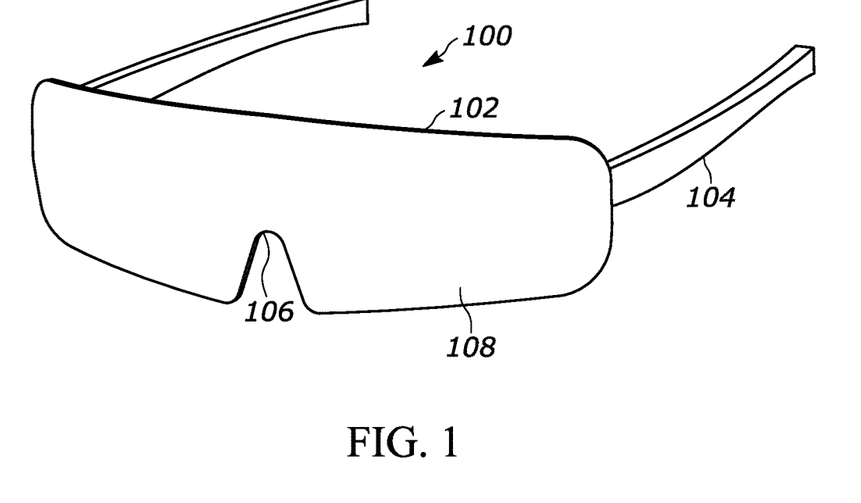
FIG. 1 illustrates a curved sunglasses-style display consistent with present principles.

Referring now to FIG. 1, a sunglasses-style assembly 100 includes a frame 102 configured for being worn on a head of a person. The frame includes left and right temples 104, a nose bridge 106, and the frame holds at least one solid or hollow waveguide 108 that is curved in at least the horizontal plane when worn and that also may be curved in the vertical plane. The waveguide 108 is configured as a single-lens sunglasses lens and is semi-transparent or transparent to visible light. The waveguide 108 may be glass or plastic and may be a prescription eyeglass lens in addition to the features described below. The waveguide 108 may be tinted in the manner of sunglasses lenses in addition to the features described below. Alternatively, the present waveguide may be incorporated into a non-sunglasses type head-mounted display.

Figure 2:
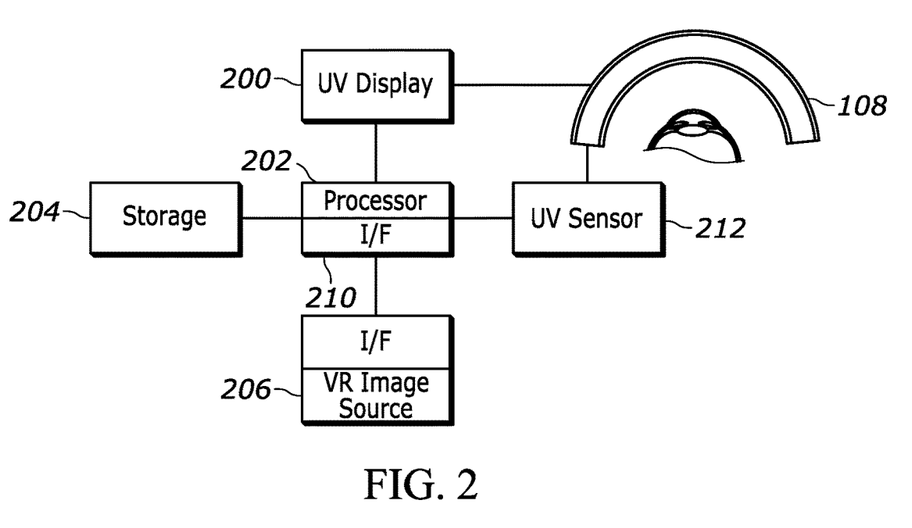
FIG. 2 is a block diagram of an example assembly consistent with present principles.

FIG. 2 illustrates that at least one UV light emitter 200 such as a UV display is in-coupled to the waveguide 108 on one end of the waveguide. The UV display can in-couple into the waveguide at a section of the waveguide that has a specifically angled planar, curved, or free form surface, with the UV display directly attached by optical glue to that section. Optionally, the in-coupling of the UV light from the UV display can be performed by an additional optical waveguide in-coupling method e.g., a coupling prism, a surface relief diffraction grating or any appropriate optical in-coupler to pass UV light into the waveguide from the UV display. The light emitted by the UV emitter 200 may be demanded virtual reality or augmented reality images under control of at least one processor 202 accessing at least one computer storage 204 to execute principles discussed herein. The demanded images may be provided by a VR (or AR) image source 206 that may be mounted on the assembly 100 along with the processor 202 or that may be remote from the assembly 100 and communicate wirelessly via appropriate wireless interfaces 210 with the processor 202. At least one UV sensor 212 may be provided to detect UV light leaking from the waveguide 108 and signal the processor 202 to disable the UV emitter 200 in response to detected UV light outside the waveguide 108.

Figure 3:
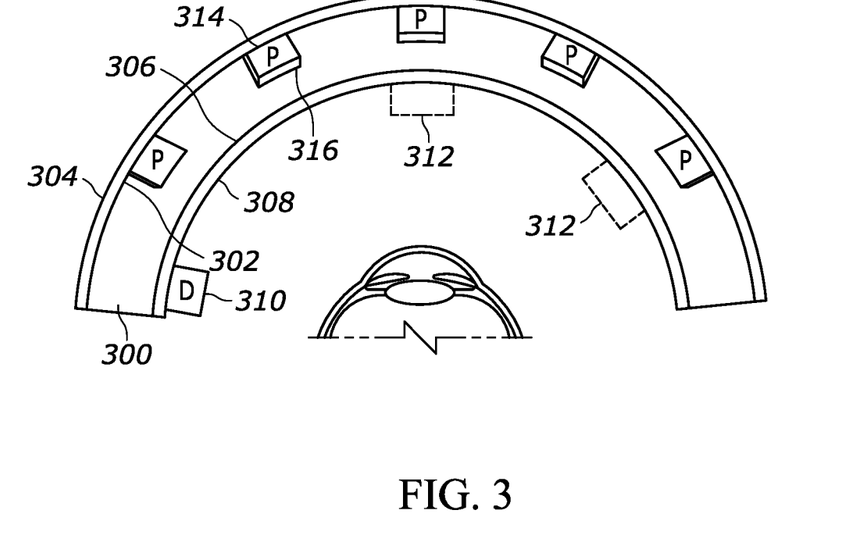
FIG. 3 is a schematic diagram of a first embodiment an example waveguide configured as curved sunglasses, as if looking down in plan view from the top of the waveguide.

FIG. 3 illustrates a first embodiment of the waveguide 108 shown in FIGS. 1 and 2 and labeled 300 in FIG. 3, configured as curved sunglasses, as if looking down in plan view from the top of the waveguide. The outer surface 302 of the waveguide 300 is covered with an ultraviolet (UV) reflective coatings (and/or films) 304 while the inner surface 306 of the waveguide 300 likewise is covered with UV coatings and/or films 308.

The coatings/films 304, 308 reflect the UV light inside the waveguide from a UV emitter 310 no matter the incident angle of the light to the surface of waveguide. Note that plural UV emitters may be used as indicated by the dashed boxes 312. In effect, a UV light passageway is defined between the UV reflective coatings and/or films.

Total internal reflection is not required in this case and the system acts like a double mirror solution (similar to solar lighting tubes used in homes), but only for UV light. UV light is trapped inside the waveguide 300 and can reflect within the waveguide at angles outside of the TIR requirement (around 42 degrees and below incident to the plane of the waveguide at the interaction point of the light and waveguide surface).

It should also be noted that this UV trap waveguide also reflects outside UV light from passing through the waveguide, and so provides useful UV protection to the wearer, in a similar manner to sunglass with UV reflective lenses.

Visible light can pass through the UV coatings and/or films 304, 308 and waveguide 300 in the same manner that light passes through curved glass or plastic (same as existing glasses, sunglasses, etc.) to provide optical pass-through of real-world light in the Optical See-through AR (OST-AR) use case.

The UV emitter 310 can be a UV light emitting diode (LED) display, a liquid crystal on silicon (LCOS) display with UV light sources, a UV laser beam scanning display, or any other display technology that can emit UV light that can couple a UV-based image into the one area (in-coupling) of the curved waveguide.

Within the waveguide 300 are UV-to-visible light conversion elements 314 (is some embodiments, disc-shaped elements preferably less than 2 mm diameter). The UV-to-visible light conversion elements 314 may be disposed in small recesses of the waveguide and glued to the waveguide during manufacture. Alternatively, the UV-to-visible light conversion elements may be placed within polymer films on the outer surfaces of the waveguide in-between the UV reflective coatings and/or films 304 and 308. The UV-to-visible light conversion elements 314 in general may be fabricated in several ways, including glued to the waveguide, bonded to the waveguide, coupled to the waveguide, placed within the waveguide, placed on the waveguide, embedded in the waveguide, deposited on the waveguide. The UV-to-visible light conversion elements 314 may produce monochrome visible light or may be configured to produce red-green-blue color light by, e.g., converting three different UV wavelengths into respective visible colors.

In one example, the elements 314 can be visible light-emitting, UV-excited phosphor embedded within a polymer. Different layers of polymer with the appropriate phosphors can exist to support different UV excitation wavelengths and different visible light emission wavelengths, and together they can perform full color (red, green, blue) emission from separate UV excitation wavelengths. These conversion elements 314 act as a self-emissive display, as they convert UV light into visible light through the excitation process. The UV conversion elements 314 may be arranged in an array, evenly or unevenly spaced apart. For an Optical See-Through AR (OST-AR) use case, sufficient space is used between the conversion elements 314 to maintain a certain level of optical transparency to pass through visible light, such that a user can see the real world without any major degradation of the view. Additionally, the spacing of the UV conversion elements may be dependent on maintaining a wide field of view in at least one axis based on the UV light arrays bouncing within the UV trap waveguide. Therefore, the size and arrangement of the UV conversion elements can be designed such that the UV light from the UV displays can bounce within the UV reflective trap waveguide and distribute the UV light images from the UV displays to all the UV conversion elements.

It should be noted that in one embodiment, as the phosphor discs preferably are only 2 mm or less in diameter and the waveguide would be very close to the eye (<15 mm), the human visual system is unable to see the conversion elements (such as phosphor discs) themselves, as they are smaller than the entrance diameter of a human eye pupil and blurred beyond recognition (due to accommodation retinal blur). It should be further noted that the phosphor light wavelength converting elements can be any shape and size.

As shown in FIG. 3, on the one side of each element 314 facing the user's eye is a micro lens 316 made of glass, plastic or polymer or other suitable material roughly less than 2 mm in diameter, i.e., the same or slightly larger than the diameter as the disc 314. Each micro lens 316, which may not affect UV wavelengths but only visible wavelengths, focuses the visible light emitted by the respective conversion element 314 to produce a virtual image when viewed by a human eye at approximately 10 mm-15 mm away in one example. The curvature and design of the micro lens 316 can be such as to adjust the virtual image focal distance that would be appropriate for the AR/VR use case. For instance, the micro lenses could produce a virtual image focused at infinity or greater than five meters for one use case, or at two meters for another use case.

It should be noted, that instead of a single micro lens, a micro lens array (MLA) may be used, or other forms of light focusing technology can be used to cover the diameter of the phosphor display. In another instance, a liquid crystal micro lens array can be used to provide dynamic focusing of the visible light image emitted from the phosphor disc array. With such a system, the focal/accommodation distance of the AR or VR view can be dynamically adjusted to account for where the user is looking based on eye gaze tracking, and/or based on the content, and/or based on the user's eyeglasses prescription, and combinations thereof.

When plural UV emitters 310, 312 are used, they may be placed at the edges of the curved waveguide 300, as needed to increase the FOV in one (horizontally or vertically) or two dimensions (horizontally and vertically). With such a system, a close form fitting sunglasses style AR/VR system can be created that can provide a FOV matching human vision (approximately 270 degrees horizontal and 170 degrees vertical).

It is to be understood that in FIG. 3 and other embodiments, infrared (IR) light may be used in lieu of UV light. In such an embodiment, in FIG. 3 the coatings/films 304, 308 are IR-reflective, passing visible light, and the emitter 310 is an IR emitter. The light converting element 314 convert IR images to visible light images.

Figure 4:
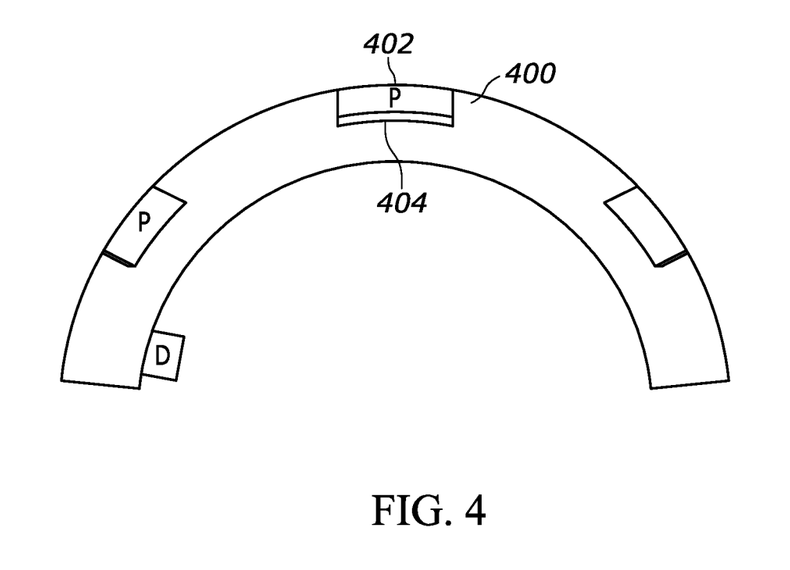
FIG. 4 is a schematic diagram of a second embodiment an example waveguide configured as curved sunglasses, as if looking down in plan view from the top of the waveguide, with the UV reflective coating removed for clarity.

FIG. 4 is a schematic diagram of a second embodiment an example waveguide 400 configured as curved sunglasses, as if looking down in plan view from the top of the waveguide, with the UV reflective coatings and/or films removed for clarity. Phosphor UV-to-visible conversion elements 402 with respective lenses 404 are used according to principles discussed above, except that fewer and larger elements 402 are used in FIG. 4 compared to the size and number of conversion elements 314 shown in FIG. 3. The size and number of conversion elements used may depend on the in-coupling angle of the UV image from the UV display, the desired FOV for the user's view, and/or whether the system is for Optical See-through Augmented Reality (OST-AR) or Virtual Reality (VR) (amongst other factors).

Figure 5:
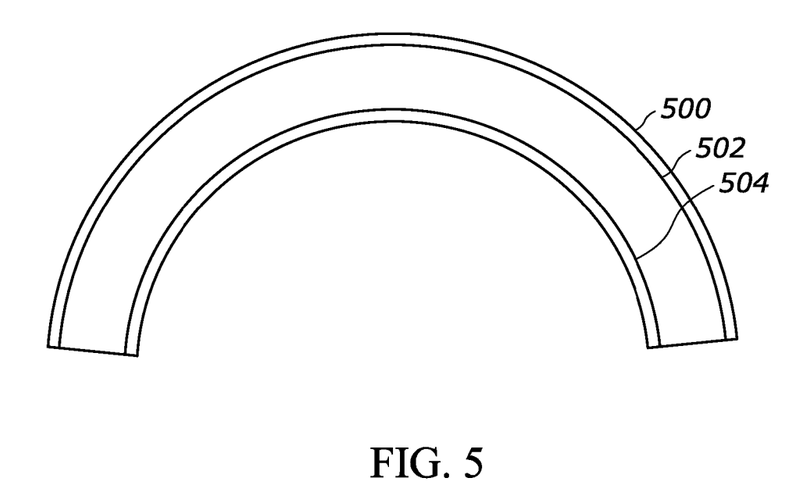
FIG. 5 is a schematic diagram of a third embodiment an example waveguide configured as curved sunglasses, as if looking down in plan view from the top of the waveguide, showing an alternate location for the UV coatings and/or films, with the phosphor elements removed for clarity.

FIG. 5 is a schematic diagram of a third embodiment an example waveguide 500 configured as curved sunglasses, as if looking down in plan view from the top of the waveguide, showing an alternate location for the UV coatings and/or films, with the phosphor elements removed for clarity. In FIG. 5, two UV films and/or coatings 502, 504 are applied within the internals of waveguide 500. This may be achieved by making the waveguide from two pieces, with the UV films and/or coatings 502 applied to the target inner surface of the further (from the user's eyes) and first waveguide piece, and UV films and/or coatings 504 applied to the target inner surface of the nearer (to the user's eyes) and second waveguide piece. The two waveguide pieces can be bonded together using any optical bonding technique, which places the UV films and/or coatings on the target surfaces within the internals of the waveguide. It should be noted that such an embodiment can provide a final waveguide in which it would be difficult for the UV reflective films and/or coatings to be scratched off, as they are protected, being internal to the plastic or glass waveguide.

Figure 5A:
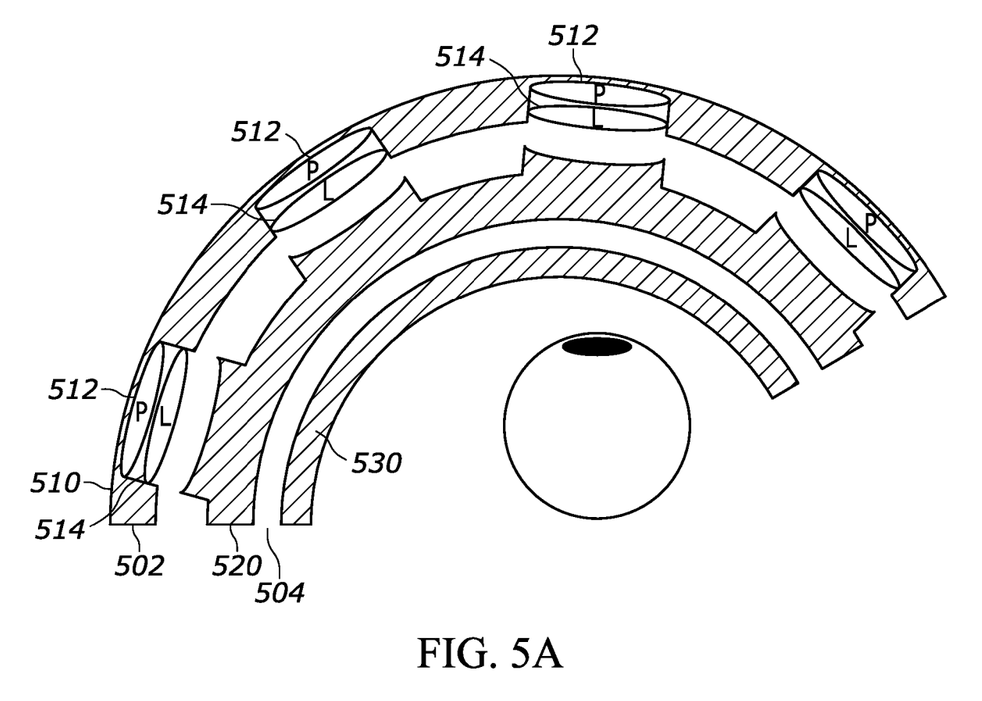
FIG. 5A is a schematic diagram of a fourth embodiment an example waveguide configured as curved sunglasses, as if looking down in plan view from the top of the waveguide onto a portion of the waveguide, showing how the waveguide is constructed from three separate pieces, with the UV coatings and/films highlighted as being internal to the waveguide after assembly.

FIG. 5A is a schematic diagram of a fourth embodiment an example waveguide configured as curved sunglasses, as if looking down in plan view from the top of the waveguide, showing that the waveguide is constructed from separate pieces 510, 520 and 530. In FIG. 5A, at least one UV film and/or coating 502 is applied to the inner surface of waveguide part 510 and at least one UV film and/or coating 504 is applied to part 530, such that when parts 510, 520 and 530 are bonded together during assembly, these coatings/films become internal to the waveguide. It should be noted that such an embodiment can provide a final waveguide in which it would be difficult for the UV reflective films and/or coatings to be scratched off, as they are protected, being internal to the plastic or glass waveguide. Parts 510, 520 and 530 can be manufactured using injection molding, 3D printing and other manufacturing techniques to make plastic or glass optical parts. It should also be noted that various manufacturing techniques can be used to apply the UV coatings and/or films 502 and 504 to the respective parts 510 and 530, including, but not limited to, vacuum bonding with matching (to the waveguide material) refractive index optical glue, sputtering deposition, pulsed laser deposition, evaporation deposition, chemical vapor deposition, etc. It should be further understood that the light wavelength conversion phosphor elements 512 shown in FIG. 5A, can be applied to the recesses of waveguide piece 510 using various manufacturing techniques, including, but not limited to vapor deposition, liquified coating and curing, additive 3D printing, adhesive bonding, etc.

Also shown in FIG. 5A, micro lens elements 514 are juxtaposed with phosphor elements 512. It should be noted that these micro lens elements 512, can be coupled to the phosphor elements 512 using various manufacturing techniques, including, but not limited to additive 3D printing, placement and fixation using optical bonding techniques, etc.

Figure 6:
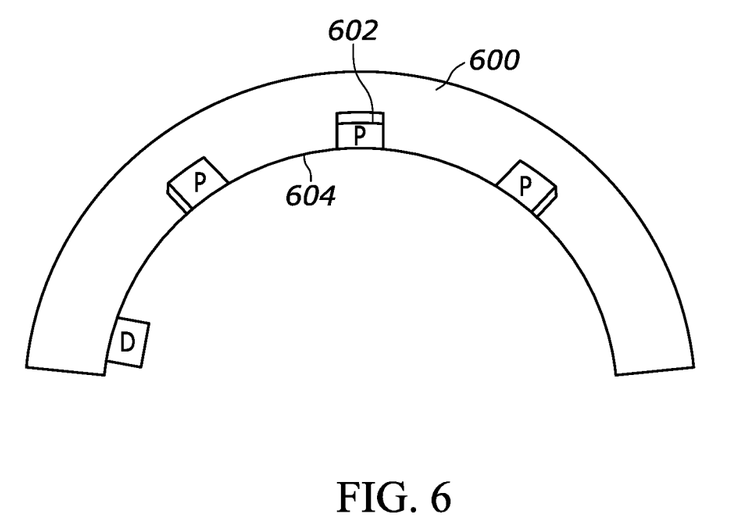
FIG. 6 is a schematic diagram of a fifth embodiment an example waveguide configured as curved sunglasses, as if looking down in plan view from the top of the waveguide, showing alternate placement of the phosphor elements, with the UV coatings and/or films removed for clarity.

FIG. 6 is a schematic diagram of a fifth embodiment an example waveguide 600 configured as curved sunglasses, as if looking down in plan view from the top of the waveguide, showing alternate placement of conversion elements 602 on the inside surface 604 of the waveguide 600, with the UV films and/or coatings removed for clarity. The UV-to-visible light conversion elements herein in general may be disposed at any appropriate locations in the UV light path.

Figure 7:
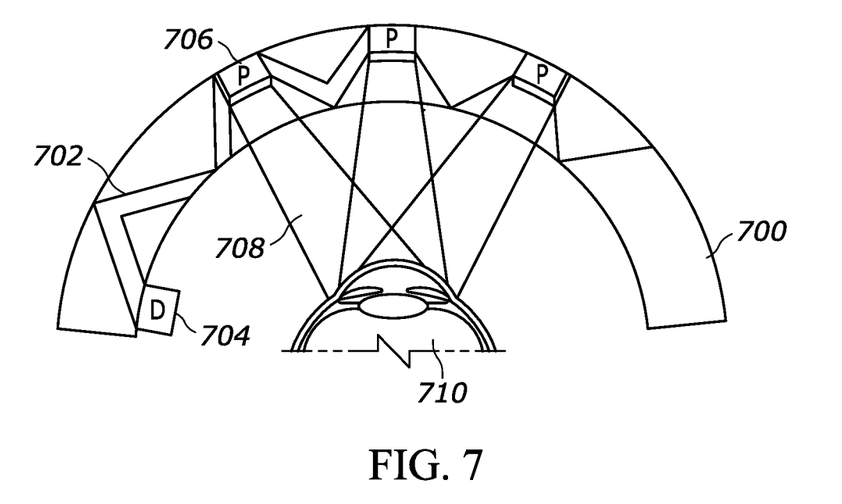
FIG. 7 is a schematic diagram of an example waveguide configured as curved sunglasses, as if looking down in plan view from the top of the waveguide, illustrating the UV or IR and visible light.

FIG. 7 is a schematic diagram of an example waveguide 700 configured as curved sunglasses such as any of the waveguides discussed herein, as if looking down in plan view from the top of the waveguide, illustrating the UV light 702 emitted from at least one UV emitter 704 and internally reflected within the waveguide with some of the UV light impinging on conversion elements 706 (UV reflection films and/or coatings and lenses not shown). The conversion elements 706 convert the UV light into beams 708 of visible light, which pass through the UV films and/or coatings and impinge on the eye 710 of the wearer. As shown, the beams 708 of visible light can overlap each other so that the wearer perceives no discontinuities in the visible image as the eye 710 rotates to view the entire field of view within the fovea.

The waveguides discussed herein may be made of solid plastic or glass or they may be hollow, i.e., with an air chamber between inner and outer surfaces of the waveguide.

The above solution provides an architecture that allows optical and mechanical designers and engineers the flexibility to create a curved form factor without having to design around the efficiency limitations of waveguide total internal reflections.

It should be understood, that bouncing image light within a curved UV trap waveguide may cause significant distortions to the UV image (composition of many pixel UV light rays) falling onto a particular phosphor disc. This would result in a highly distorted and incomprehensible visible image being shown to the user. The amount of distortion depends on the curvature and thickness of the waveguide, as well as the placement and angle of the phosphor discs and UV displays (amongst other factors).

Accordingly, present principles provided at least four techniques may be used individually or collectively to address the problem noted above.

Firstly, the UV image light emitted from the UV display may be pre-distorted prior to or during the process of in-coupling into the waveguide. This can be achieved using a specifically designed passive optical element, such as a freeform optical lens, a surface relief diffractive grating, a diffractive volume hologram, or via a dynamic optical solution such as a phase Liquid Crystal on Silicon (LCOS) spatial light modulator containing a phase holographic freeform lens image. Regardless of the optical technology, the UV light image can be pre-distorted to account for the distortions caused to the UV image light that would fall onto each phosphor display.

Secondly, the phosphor display discs themselves can be orientated (angled in respect to the waveguide surface facing the user), contain some curvature (in either or both surface axis) or be a freeform surface to account for UV image distortions, such that the visible light (after passing through the micro lens covering the phosphor display) is correct for the user's pupil, viewing the field of view provided.

Thirdly, the micro lens covering the phosphor display can account for the distortions to the visible image being displayed by each phosphor display, by having an asymmetric design or being completely free form. It should also be noted that the micro lens may also be a diffractive based lens (surface relief grating, volume holographic) and be designed to correct any distortions from the phosphor display.

Fourthly, the curvature of the outer surface of the waveguide may be different from the curvature of the inner surface of the waveguide, which may be used to reduce distortions of the images before being converted by the phosphor elements.

It should be understood that additional optical elements may be added (internally or externally) to the curved waveguide to provide expansion of the UV or IR in-coupled image before it is converted by the phosphor elements. This image expansion is commonly referred to as exit pupil expansion and may be performed in one axis or two axes, to expand the size of the image bouncing inside the double reflective waveguide. The optical elements that facilitate exit pupil expansion may be positioned after the in-coupling from the UV or IR emitters and prior to the UV or IR images impinging on the light conversion elements. In one embodiment, the surfaces of the curved waveguide may contain structures (surface relief gratings, etc.) used to perform exit pupil expansion in one axis or two axes and be covered with reflective coatings or films to implement the double reflective curved waveguide solution describe herein. As described in the description for FIG. 5A, these surfaces can be constructed to be internal to the waveguide if the waveguide is made from separate adjoining pieces.

And yet again, the exit pupil expansion function, double reflection and image distortion correction may be all performed by the same structures on the (internal or external) surfaces of the waveguide in the light passageway from the light emitters to the light conversion elements. Therefore, it should be understood that such a system could utilize smaller light emitters for a smaller in-coupling area compared to the out-coupling area containing the light conversion elements with their associated micro lenses, which would facilitate a close-form fitting sunglasses-style assembly as described in the description for FIG. 1.

The waveguides above can be perceptually fully transparent or semi-transparent, can be unpowered by electricity, and do not have to account for total internal reflection owing to the use of two UV or IR reflective coatings and/or films.

Figure 8:
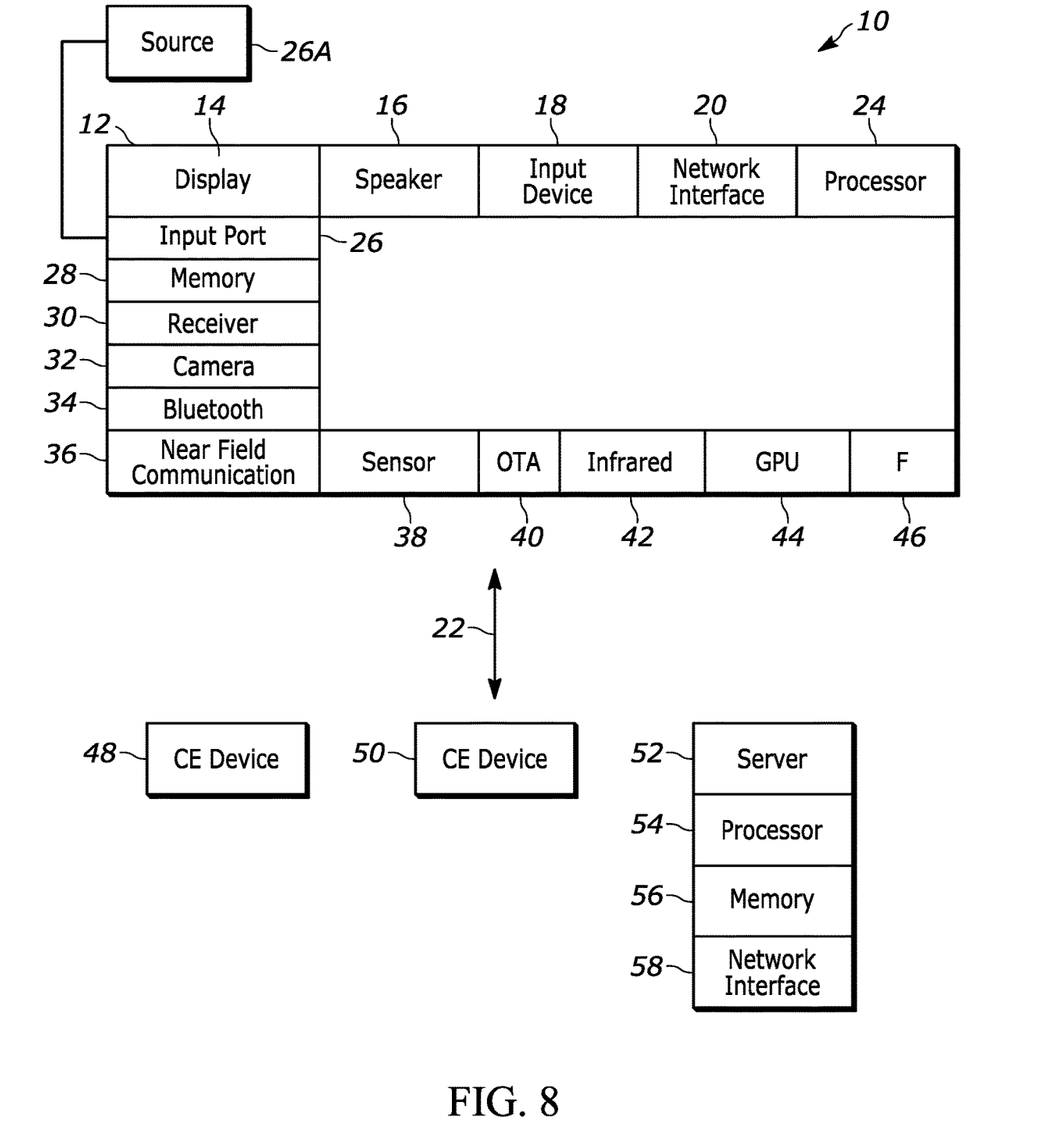
FIG. 8 is a block diagram of an example system in accordance with present principles perspective view of an example headset.

Referring to FIG. 8, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content. The HMD may implement the sunglasses-style structure shown herein.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

While the particular embodiments are herein shown and described in detail, it is to be understood that the subject matter which is encompassed by the present invention is limited only by the claims.

What is claimed is:

1. An assembly, comprising:
   a curved waveguide;
   a first ultraviolet (UV)-light-reflecting coatings and/or films disposed on the curved waveguide;
   a second UV light-reflecting coatings and/or films disposed on the curved waveguide;
   at least one UV emitter configured to emit UV light in to the curved waveguide between the first and second UV light-reflecting coatings and/or films;
   at least one conversion element in the curved waveguide and disposed to receive the UV light from the UV emitter, the conversion element being configured to convert the UV light in to visible light that propagates through one or both of the first and second UV light-reflecting coatings and/or films and that impinges on the eye of a wearer of the curved waveguide; and
   at least one lens juxtaposed with the conversion element through which the visible light emitted by the conversion element is focused.

2. The assembly of claim 1, wherein the assembly is configured as sunglasses and the curved waveguide is coupled to left and right temples to be disposed in front of a wearer's face when the assembly is worn by the wearer, and the curved waveguide is established by first and second parallel surfaces between which UV light propagates, the first and second parallel surfaces being parallel to each other and curved, the first and second UV light-reflecting coatings being respectively disposed on the first and second parallel surfaces.

3. The assembly of claim 1, comprising at least one lens juxtaposed with the conversion element through which visible light emitted by the conversion element is focused, the lens being disposed between the conversion element and the UV emitter.

4. The assembly of claim 1, wherein the UV light emitted from the UV emitter is pre-distorted prior to or during the process of in-coupling into the curved waveguide using a specifically designed passive optical element or via a dynamic optical solution.

5. The assembly of claim 1, wherein the first and second UV light-reflecting coatings and/or films pass visible light from outside the assembly.

6. The assembly of claim 1, comprising at least one lens juxtaposed with the conversion element through which visible light emitted by the conversion element is focused, the lens having an asymmetric design or being completely free form.

7. The assembly of claim 1, wherein curvature of an outer surface of the curved waveguide is different from curvature of an inner surface of the curved waveguide.

8. The assembly of claim 1, wherein the conversion element is juxtaposed with an inner surface of the curved waveguide.

9. The assembly of claim 1, wherein a UV light passageway is defined between the first and second UV light-reflecting coatings and/or films, and the assembly comprises at least one UV sensor positioned to receive UV light propagating through a surface of the UV light passageway and located outside the UV light passageway to generate at least one signal upon detection of UV light, the signal being operable to cause the UV emitter to stop emitting UV light into the UV light passageway.

10. The assembly of claim 1, wherein the UV emitter comprises at least one UV display.

11. An apparatus, comprising:
at least one curved waveguide configured to be worn on the head of a person and defining an infrared (IR) light passageway in which IR light is constrained from passing through;
at least one IR emitter optically coupled to the light passageway to emit demanded virtual reality (VR) and/or augmented reality (AR) images into the light passageway;
at least one conversion element in the light passageway to receive IR light from the IR emitter, the conversion element being configured to convert the IR light into visible light that propagates out of the light passageway to impinge on an eye of the person when the person is wearing the at least one curved waveguide; and
at least one lens juxtaposed with the conversion element through which the visible light emitted by the conversion element is focused.

12. The apparatus of claim 11, wherein the light passageway is defined between first and second IR light-reflecting coatings and/or films disposed on the at least one curved waveguide.

13. The apparatus of claim 12, wherein the IR light-reflecting coatings and/or films pass visible light.

14. The apparatus of claim 11, wherein the apparatus is configured as sunglasses and the at least one curved waveguide is coupled to left and right temples to be disposed in front of a wearer's face when the apparatus is worn by the wearer.

15. The apparatus of claim 11, comprising plural conversion elements in the at least one curved waveguide.

16. The apparatus of claim 11, wherein:
a geometry of the at least one conversion element comprising phosphor display discs is configured to correct distortions in the visible light prior to impinging on the eye of the person wearing the at least one curved waveguide.

17. The apparatus of claim 11, wherein the conversion element is juxtaposed with an outer surface of the at least one curved waveguide.

18. The apparatus of claim 11, wherein the conversion element is juxtaposed with an inner surface of the at least one curved waveguide.

19. The apparatus of claim 11, comprising at least one IR sensor outside the IR light passageway to generate at least one signal upon detection of IR light, the signal being operable to cause the IR emitter to stop emitting IR light into the light passageway.

20. An apparatus, comprising:
at least one curved waveguide configured to be worn on the head of a person and defining an ultraviolet (UV) or infrared (IR) light passageway in which UV or IR light is constrained from passing through, the light passageway comprising at least one conversion element wherein at least one lens is juxtaposed with the conversion element through which visible light emitted by the conversion element is focused;
at least one UV or IR emitter optically coupled to the light passageway to emit demanded images into the light passageway; and
at least one UV or IR sensor outside the UV or IR light passageway to generate at least one signal upon detection of the UV or IR light, the signal being operable to cause the UV or IR emitter to stop emitting the UV or IR light into the light passageway.

* * * * *